June 14, 1927. T. HALL 1,632,131
SEARCHLIGHT
Filed Aug. 23, 1919 4 Sheets-Sheet 1
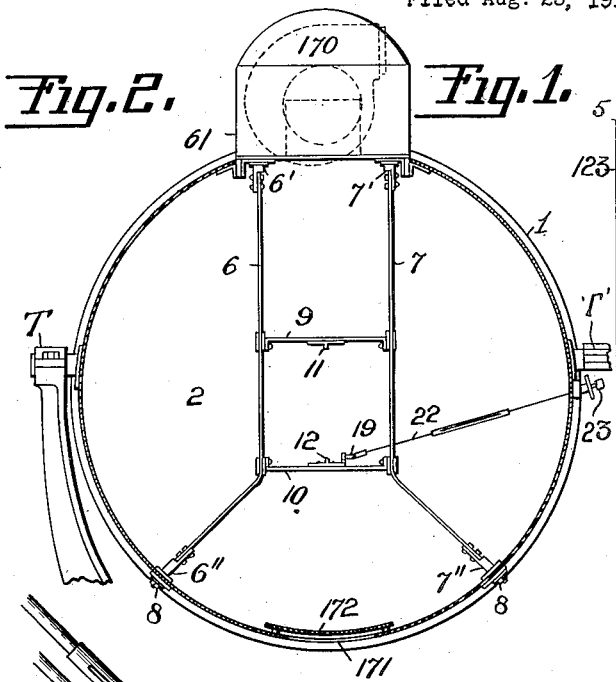
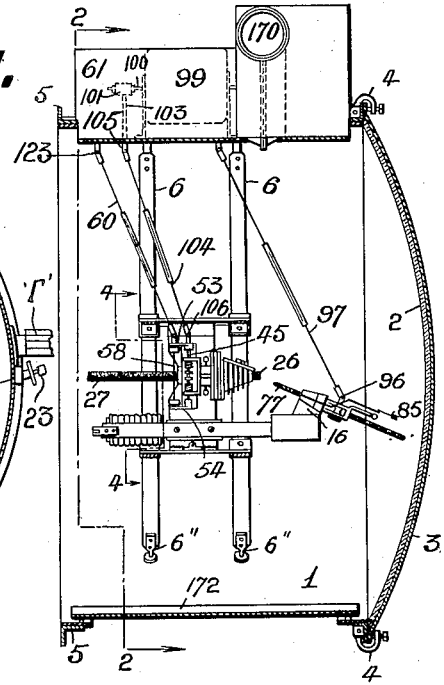
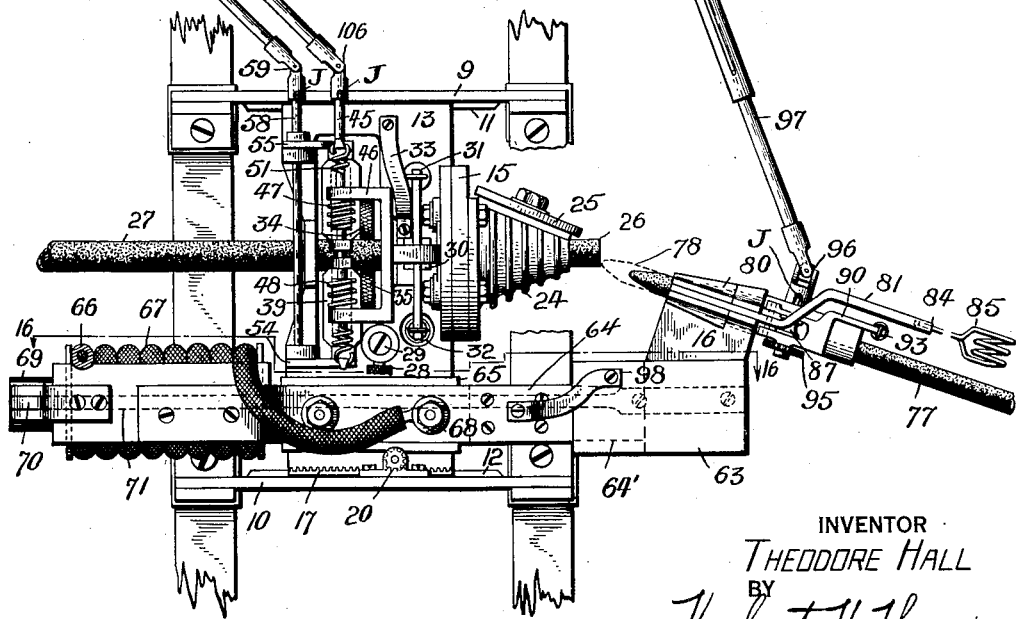
INVENTOR
THEODORE HALL
BY
Herbert H. Thompson
his ATTORNEY June 14, 1927.
T. HALL
SEARCHLIGHT
Filed Aug. 23, 1919
1,632,131
4 Sheets-Sheet 2
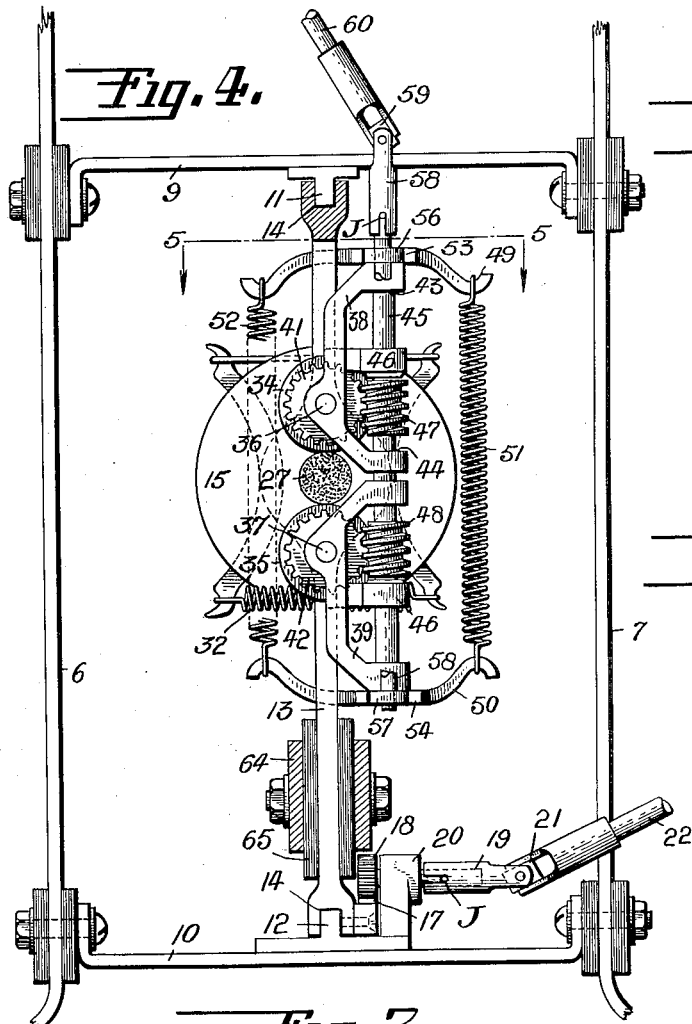
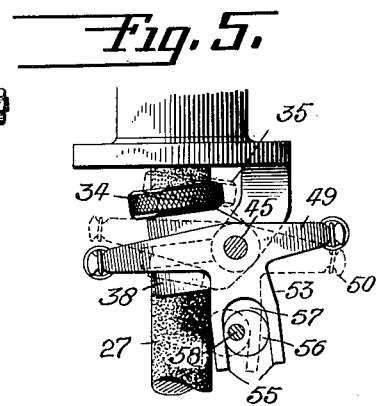
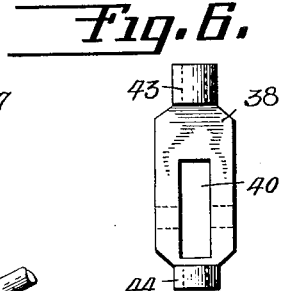
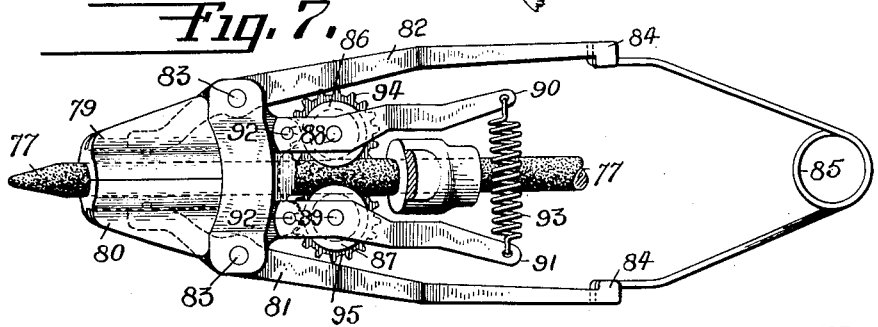
INVENTOR
THEODORE HALL
BY
Herbert H. Thompson
his ATTORNEY

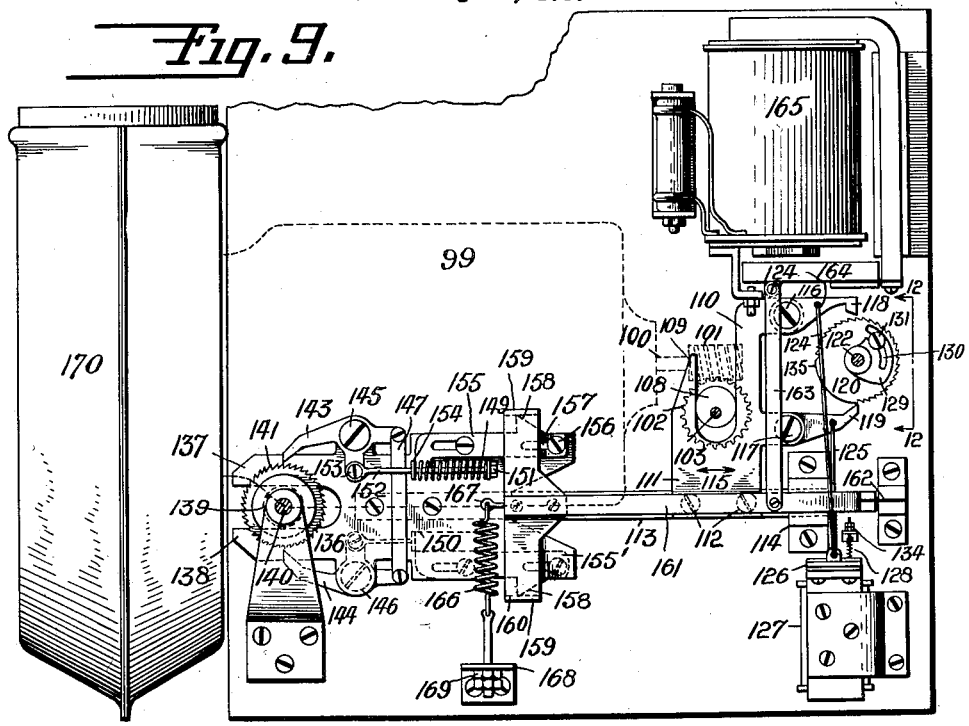
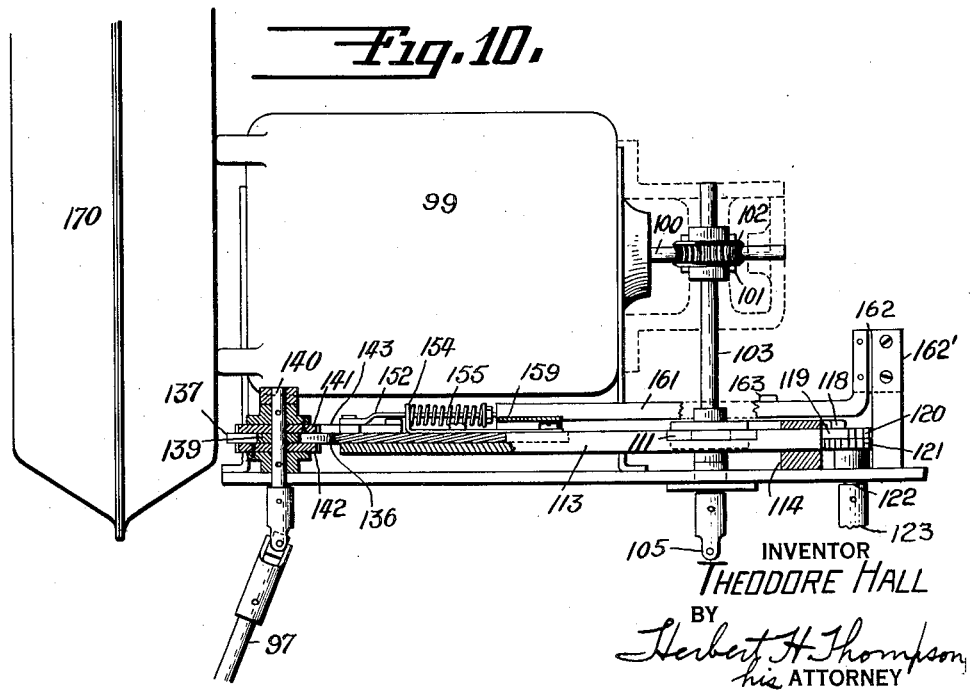

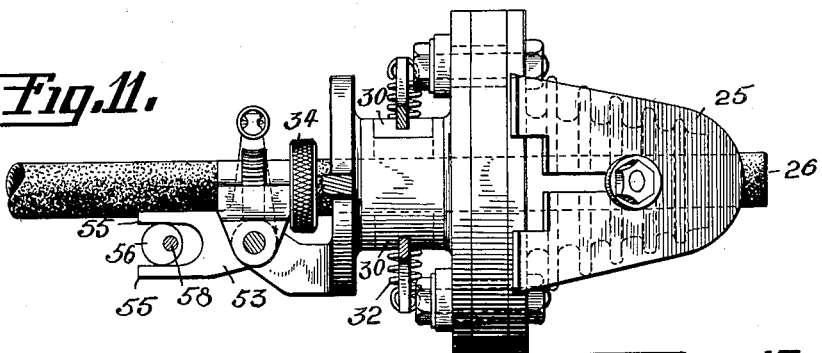
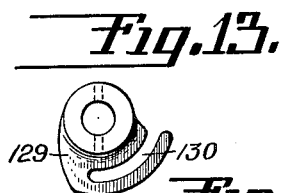
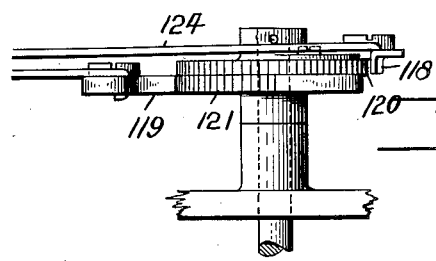
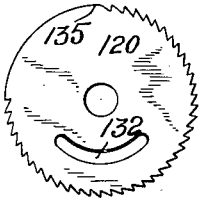
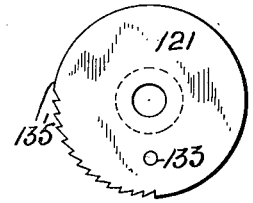
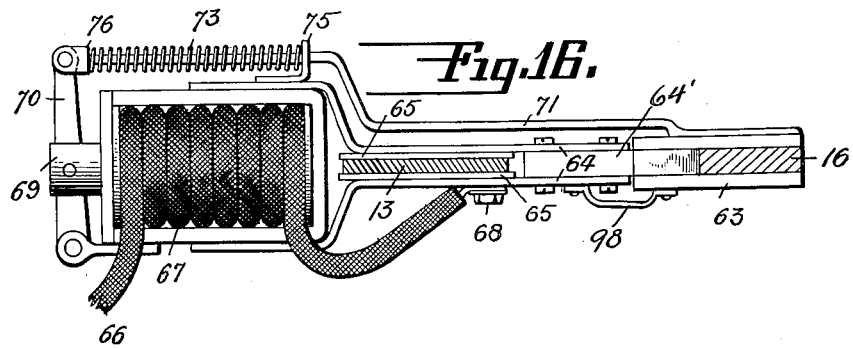

Patented June 14, 1927.

1,632,131

UNITED STATES PATENT OFFICE.

THEODORE HALL, OF BROOKLYN, NEW YORK, ASSIGNOR TO THE SPERRY GYROSCOPE COMPANY, OF BROOKLYN, NEW YORK, A CORPORATION OF NEW YORK.

SEARCHLIGHT.

Application filed August 23, 1919. Serial No. 319,382.

This invention relates to searchlights, and more particularly to portable searchlights.

The object of the invention is to produce a searchlight of sufficiently light weight to be mounted on a truck for operation and rapid transportation, and yet of sufficiently rugged structure to withstand the shocks and strains to which such a device is apt to be subjected under military service conditions.

Another object is to produce a searchlight of this character without sacrificing any of the sensitive automatic focusing and other control devices of a high standard searchlight.

Referring to the drawings wherein I have shown what I now consider to be the preferred form of my invention:

Fig. 1 is a sectional side elevation of a searchlight drum with the lamp mechanism therein.

Fig. 2 is a sectional front elevation thereof taken on line 2—2 of Fig. 1 with the lamp mechanism removed.

Fig. 3 is an enlarged view of the lamp mechanism shown in Fig. 1.

Fig. 4 is a front elevation of the lamp mechanism taken approximately on line 4—4 of Fig. 1.

Fig. 5 is a detail of the positive electrode feeding and rotating mechanism taken on line 5—5 of Fig. 4.

Fig. 6 is a detail of means for carrying the feed and rotation rollers.

Fig. 7 is a top view of the negative electrode holder.

Fig. 8 is a detail showing one of the negative electrode clamping jaws and brushes.

Fig. 9 is a plan view of the controlling mechanism contained in the control box at the top of the drum.

Fig. 10 is a side elevation of a part of said mechanism.

Fig. 11 is a top view of the positive electrode holder.

Fig. 12 is a detail taken on line 12—12 of Fig. 9.

Figs. 13, 14, and 15 are details of a portion of the mechanism shown in Fig. 9 for controlling the rate of feed of the positive electrode.

Fig. 16 is a section taken on line 16—16 of Fig. 3.

In the drawings the drum is shown at 1 having a parabolic mirror 2 held in one end thereof by a backing 3 secured to the drum by means of clamps 4. The searchlight is represented as supported on horizontal trunnions T and T'. In order that the entire searchlight shall be extremely light in weight the drum is preferably made of thin sheet metal reinforced at the ends by angle irons 5. In order to stiffen the drum structure against sagging between said trunnions T and T' bracing strips 6—7 are shown secured across the interior thereof as at 6', 6", 7', and 7", a nut 8 being provided for the purpose of tightening up on the said braces. These braces, moreover, are shown as linked together by means of cross members 9—10. Fastened to the said cross members are shown guide strips 11—12 over which is slidably mounted a plate 13 having grooves 14 engaging said guide strips (see also Figs. 3 and 4). Positive and negative electrode holders 15 and 16 are carried by the said plate 13 and may be moved as a unit toward or away from the mirror 2 for focusing the light by moving plate 13 along said guide strips. By this means the focusing is accomplished without disturbing the arc length. For this purpose a rack 17 is shown secured to the plate 13 and is engaged by a pinion 18 on a shaft 19 bearing in a fixed member 20. Secured to said shaft 19 by means of a universal joint 21 is shown an extensible rod 22 reaching without the drum and provided with a knob 23 for turning the same; the object of having the rod extensible being to permit slight relative movements of the drum and member 10 which carries the inner end of said rod without straining any of the parts or connections. It will be seen that by turning the knob 23 the electrode holders will be moved back and forth as a unit. This construction also furnishes a ready means for removing the holders from the drum. For this purpose all of the control rods 22, 60, 104, and 97

(hereinafter described) are detachably connected to the holders through bayonet joints J. The positive electrode holder 15 is shown as provided with heat radiating fins 24 and a third electrode 25 for maintaining the source of light within the end 26 of the positive electrode 27 at the proper distance from the mirror in the same manner as disclosed in my copending application Serial No. 272,328 for "flaming arc flood lights," filed January 21, 1919. The positive head 28 may be secured to plate 13 as at 29 and the current carried to the positive electrode by means of brushes 30 engaged by bars 31 and pressed by spring 32 into firm contact with the said electrode. Resilient jumpers 33 are secured to plate 13 and to the said brushes to insure a good electrical contact between said plate and brushes. For the purpose of rotating and feeding the positive electrode I have shown a pair of rollers 34—35 (Figs. 4 and 11) engaging said electrode at opposite sides. Said rollers are mounted upon shafts 36—37 having their bearings in members 38—39 having slots 40 within which are carried worm wheels 41—42 secured upon said shafts 36—37. Said members 38—39 are shown as loosely mounted at 43—44 on a shaft 45 which shaft has its bearings in a bifurcated frame 46 secured to plate 13. Fixed on said shaft 45 are a pair of worms 47—48 meshing with worm wheels 41—42. A pair of cross-bars 49—50 integral with members 38—39 are shown as pressed toward each other by springs 51—52 for the purpose of pressing rollers 34—35 resiliently into contact with the electrode 27. The rotation of shaft 45 will through worms 47—48 and worm wheels 41—42 cause the rollers 34—35 to rotate and thus in turn impart a rotary motion to the positive electrode. In order to impart an axial movement to the said electrode I may provide means for shifting the plane of rotation of said rollers and thus convert the rotary motion of the electrode into a screw motion in either a forward or a backward direction so that the electrode tip may be advanced or retracted as may be necessary. For this purpose members 38 and 39 may be provided with bifurcated lever arms 53—54. Between the prongs 55 of said levers 53—54 are shown cams 56—57 mounted upon a common shaft 58 which shaft is secured by means of a universal joint 59 to an extensible rod 60 reaching up into the control box 61. Said cams 56—57 may be oppositely positioned with respect to each other upon shaft 58 so that the rotation of said shaft will move levers 53—54 in opposite directions, as indicated in Fig. 5, so as to tilt rollers 34—35 in opposite directions.

The negative electrode holder 16 is shown as secured to a member 63 slidably mounted upon the outer end of a member 64' secured between members 64 which are in turn secured to plate 13 and insulated therefrom by means of insulation 65. The negative feed line 66 is shown as connected to a solenoid 67, the opposite end of which is connected to the bar 64 at 68. The core 69 of said solenoid is shown as having connected thereto a crossbar 70 which bar is in turn connected by rod 71 to the slidable member 63. Spring 73 is shown carried by said rod between shoulder 76 and a relatively stationary member 75 so as to normally hold the electrode holder 16 in a closed position in which the negative electrode 77 engages the tip of the positive electrode, as indicated by dotted lines 78. Thus when the current is turned on it will flow freely from one electrode to the other. At the same time energization of the solenoid 67 will attract the core 69 and draw the arc by moving the holder 16 into the full line position as shown. In order to obtain a firm electrical contact between the holder 16 and the electrode 77 I have shown a pair of brushes 79—80 pressed into contact with electrode 77 by means of levers 81—82 pivoted at 83 and pressed apart at their outer ends 84 by means of a spring 85. For the feeding of the negative electrode I may employ a pair of rollers 86—87 mounted on shafts 88—89 in levers 90—91 pivoted to the holder at 92 and pressed together at their outer ends by means of a spring 93 to hold said rollers resiliently in contact with the negative electrode. Said shafts 88—89 may be provided with intermeshing gears 94—95, one or the other of the said shafts being connected by means of a universal joint 96 to an extensible rod 97 reaching into the control box 61. Rotation of rod 97 will thus obviously impart an axial movement to electrode 77 in one direction or the other. For the purpose of securing good electrical communication between members 63—64 I may employ a resilient jumper 98 secured to said members, the same being sufficiently long to permit the relative axial movement of said members in striking the arc. Without the top of the drum 1 is shown the control box 61 (see also Figs. 9 and 10). The motor 99 is mounted in the said box. Upon the shaft 100 of said motor is shown a worm 101 meshing with a worm wheel 102 on a shaft 103 reaching down into the drum and connected to an extensible rod 104 by means of a universal joint 105. Said rod is in turn connected by means of a universal joint 106 to the shaft 45. The object in making rod 104 and also rods 60 and 97 extensible is to permit plate or carriage 13 to slide freely back and forth on its guides 11 and 12. The motor is adapted to run constantly during the operation of the lamp so that shaft 45 with worms 47—48 will also operate constantly and thus impart a constant rotary motion to the positive electrode 27. Secured to shaft 103 in the control box is shown a cam 108 positioned between the projections 109—110 of a bifurcated member 111. Said member 111 is secured by means of screws 112 to a rod 113 bearing at one end in a guide member 114 so that the constant rotation of shaft 103 will impart a constant reciprocatory motion to member 111 in the directions indicated by the double arrow 115. Pivotally secured to member 111 at 116 and 117 may be provided a pair of pawls 118—119 adapted to engage corresponding ratchets 120—121 on a shaft 122 which is connected by means of a universal joint 123 to the extensible rod 60. A pair of links 124—125 secured to the pawls 118—119 may in turn be secured at their opposite ends to the armature 126 of a magnet 127. Said armature 126 may be held normally in the open position by means of a spring 128. The magnet 127 may be controlled through the third electrode 25 as set forth in my aforesaid copending application so that as the positive electrode is consumed the said magnet will become sufficiently energized to attract armature 126 and pull the pawl 118 into engagement with ratchet 120 while if the positive electrode is fed forward too far the spring 128 will move the armature 126 into its open position causing pawl 119 to engage ratchet 121. Said ratchets 120—121 are loosely mounted on shaft 122 adjacent a member 129 which is securely mounted on said shaft. Member 129 may be provided with a slot 130 through which projects a screw 131 passing also through a slot 132 (see also Figs. 13, 14, 15) in ratchet 120 into a threaded hole 133 in ratchet 121. By tightening screw 131 it will thus be seen that ratchets 120—121 may be secured to shaft 122 so that the rotation of either ratchet will effect the rotation of said shaft. During the reciprocatory motion of member 111 the pawls 118—119 are moved back and forth adjacent ratchets 120—121. If the tip 26 of the positive electrode is in the proper position both of said pawls will move without engaging their respective ratchets. The adjustment for this purpose is effected by varying the tension of spring 128 through nuts 134. But when the said tip 26 is out of its proper position one or the other of said pawls will engage its ratchet as heretofore pointed out and rotate shaft 122, rod 60, and shaft 58 which carries the eccentrics 56—57 so that the plane of rotation of the rollers 34—35 will be shifted as pointed out to move said electrode axially in the proper direction. The rate of said axial movement will obviously depend upon the angle through which the plane of rotation of said rollers is changed. Thus if the tip 26 of electrode 27 burns back too far the pawl 118 will engage ratchet 120 during each of its reciprocatory movements in the forward direction until it has turned said ratchet to the point where the pawl 118 will engage the smooth circumference 135. No further rotation of ratchet 120 will then take place even though the pawl 118 continues to engage the same since said pawl will simply slide over the smooth edge 135. The rate of feed of the electrode will thus continue constant at its maximum speed until shaft 122 is turned in the opposite direction. A similar smooth surface 135′ may be provided on ratchet 121 to fix the maximum speed at which the electrode may be fed in the opposite direction. In order to adjust the maximum feed in either direction I may adjust the positions of ratchets 120—121 with respect to each other and with respect to member 129 securing the same by means of screw 131 as previously pointed out. Secured adjacent one end of rod 113 I have shown a bifurcated member 136 having its projections 137—138 engaging opposite sides of a washer 139 on a shaft 140 between a pair of oppositely pitched ratchet wheels 141—142. A pair of pawls 143—144 are pivotally secured to member 136 at 145—146, each of said pawls being adapted to engage one of said ratchet wheels 141—142. By means of the reciprocatory motion of rod 113 the said pawls are thus moved back and forth adjacent the said ratchets. Said pawls are preferably linked together by means of a link 147 and are individually pressed toward their respective ratchets by means of springs 149—150. Said springs press at one end against a nut 151 on the rod 152 secured to the said pawls at 153 and at the other end against a projection 154 on a member 155 mounted on the reciprocatory member 136 by means of screws 156 passing through slots 157 in member 155 and into said reciprocatory member. Members 155—155′ may be provided with projections 158. A cross-bar 159 may be provided with downward projections 160 adjacent said projections 158. Said cross-bar 159 is in turn mounted on an arm 161 secured by means of a metallic hinge 162 to a post 162′ fixed to the control box. A link 163 is shown connecting said arm to the armature 164 of an electro-magnet 165. Said electro-magnet may be placed in series with the arc circuit as set forth in my aforesaid copending application so that when the arc becomes too long the armature 164 will be attracted thus pulling cross-bar 159 to one side so that one of projections 158 will, during its reciprocatory movement, engage the corresponding downward projection 160 so as to exert a pull upon the corresponding pawl 144 to place the same into engagement with its ratchet 142. The reciprocatory movement of said pawl will then rotate ratchet 142 in one direction so as to rotate shaft 140, extensible rod 97, and the negative feed rollers 86—87 to feed the negative electrode 77 toward the positive electrode 27. A spring 166 secured at one end to crossbar 159 by means of a hook 167 and at the other end to a bracket 168 carried by the control box may be provided to pull crossbar 159 in the opposite direction against the action of magnet 165 so that when the arc becomes too short by reason of the negative electrode having been fed too far forward or by reason of the positive electrode having been fed toward the negative, said bar 159 will be moved into such position that the opposite projection 158 will engage corresponding downward projection 160 so as to pull pawl 143 into engagement with ratchet 141 to rotate shaft 140 in the opposite direction and thus retract the negative electrode. In order to adjust the length of the arc the tension of spring 166 may be varied by adjusting the position of nuts 169 so that the bar 159 may be balanced when the arc is of the desired length. By the novel construction of pawl actuating mechanism herein described, the electro-magnet is relieved of the work of moving the pawls so that the sensitiveness of control remains unimpaired.

For the purpose of ventilating the searchlight drum I have shown a fan 170 at the top of said drum actuated by motor 99 to exhaust the air from the drum, an opening 171 being provided at the bottom of the drum to permit the entrance of fresh air. A baffle 172 may be provided over the said opening to direct the incoming air toward the sides of the drum.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. In a searchlight, a drum, means connected across the interior of said drum for bracing the same, a pair of electrode holders carried by said bracing means, means for moving said holders relatively, and means extending without the drum for shifting said holders together to vary the dispersion of the beam.

2. In a searchlight, a drum, means extending across the inside of said drum for bracing the same, a plurality of movable electrode holders supported by said bracing means, means on each holder for feeding an electrode therethrough, a motor without said drum, and detachable means connecting said motor with said feeding means for actuating the same.

3. In a searchlight, a drum, a plurality of transversely extending rods within the same, a member concentric with said drum slidably supported by said rods for movement along the axis of said drum, a pair of electrode holders carried by said member, and means for adjusting the position of said member.

4. A searchlight comprising a drum, electrode-feeding and ventilating means located adjacent the top thereof, a motor for operating the same, brace rods extending downwardly across the interior of the drum, and an electrode holder supported by said rods.

5. In a searchlight, a fixed support adjacent the center of the drum, a holder for the electrodes removably mounted thereon, a feed roller on the holder, actuating means therefor located without the drum, and a detachable shaft connecting said roller and said actuating means.

6. In a searchlight, a drum of sheet material adapted to be supported on trunnions, a plurality of brace rods secured to and extending across the interior of the drum at an angle to the axis of said trunnions for bracing the same, a transverse rod connecting said brace rods, and an electrode holder movably supported on said rod.

7. In a searchlight, a drum, means secured to and connected across the interior of said drum for bracing the same, and a pair of electrode holders carried by said bracing means.

8. In a searchlight, a drum, means secured to and connected across the interior of said drum for bracing the same, and a pair of electrode holders and electrode feeding means supported by said first named means.

9. A searchlight comprising a light-weight drum, brace rods within said drum for strengthening the same, and an electrode-supporting carriage slidably mounted upon said rods.

10. A searchlight comprising a light-weight drum, brace rods within said drum for strengthening the same, an electrode-supporting carriage slidably mounted upon said rods, means without the drum for actuating said carriage, and an extensible connection between said carriage and said means.

11. A searchlight comprising a drum, a removable electrode-supporting means, and means fixed to said drum for supporting said electrode-supporting means spaced from the walls of said drum.

12. A searchlight comprising a drum, a control box fixed to the top of said drum, a carriage upon which the electrodes are adapted to be mounted, means for supporting said carriage spaced from the walls of said drum, and means whereby said carriage is controlled from said control box.

13. A searchlight comprising a drum, a control box fixed to the top of said drum, a carriage upon which the electrodes are adapted to be mounted, means for supporting said carriage spaced from the walls of said drum, and means including extensible connections whereby said carriage is controlled from said control box.

In testimony whereof I have affixed my signature.

THEODORE HALL.